Patented Mar. 17, 1953

2,632,022

UNITED STATES PATENT OFFICE 2,632,022

METHOD OF PREPARING 1,8-DIAMINO-P-MENTHANE

Newman M. Bortnick, Philadelphia, Pa., assignor to Rohm & Haas Company, Philadelphia, Pa., a corporation of Delaware No Drawing. Application July 7, 1950,
Serial No. 172,624

2 Claims. (Cl. 260—563)

This invention relates to a new process for the preparation of 1,8-diamino-p-menthane having the following structural formula

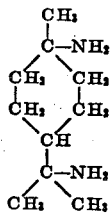

The process of this invention is convenient and efficient and gives rise to a compound which is useful in the preparation of linear polymers and whose derivatives such as Schiff's bases are unusually stable.

The process comprises reacting, in the presence of water, hydrogen cyanide and sulfuric acid with a raw material from the class consisting of limonene (dipentene), α-terpineol, β-terpineol, terpin hydrate and α-pinene. These last compounds, which for convenience are herein referred to as raw materials or substrates, are readily available and ordinarily cheap, and therefore serve as an excellent source of 1,8-diamino-p-menthane.

During the process, hydrogen cyanide combines with said raw materials in the ratio of two moles of hydrogen cyanide to one mole of the latter. A lower ratio naturally results in a lowered yield of product, and, on the other hand, there does not appear to be any advantage in using the hydrogen cyanide in a ratio higher than that of three moles of hydrogen cyanide to one mole of the above-identified raw materials. The recommended ratio therefore is 2–2.5 moles of the former to one of the latter.

The role of the sulfuric acid is that of reactant—not catalyst—and two moles of acid react with one mole of the same substrate. In the presence of water, however, somewhat less than the ratio of two moles of acid can be employed since the water brings about some regeneration of the acid during the course of the process. In any case a minimum ratio of 1.5 moles of sulfuric acid per mole of said substrate is required. It is further recommended that the maximum ratio be 2.5 moles on the same basis, though up to 5 moles can be employed.

The reaction, which is carried out in an aqueous medium, can be considered to take place in two steps and of real importance is the amount of water which is present in each step. In the first step the amount of water which is present directly influences the concentration and hence the reactivity of the sulfuric acid with the hydrogen cyanide and substrate. It is essential that the concentration of sulfuric acid at this point be from 16% to 90%—or preferably from 25% to 60%. It follows therefore that the amount of water employed must be from about one-tenth to approximately five times the weight of the sulfuric acid—or preferably from about two-thirds to three times the weight of acid.

It is necessary to employ proper controls in the preparation of the aqueous mixture because the reaction of substrate, hydrogen cyanide and sulfuric acid is exothermic and occurs readily and can carry the temperature to dangerous limits. In order to regulate the rate of reaction it is important that the temperature be maintained between about 15° C. and 50° C. during the mixing of the reactants. Ordinarily the sulfuric acid is added slowly to the other components of the reaction mixture, but the order of mixing can be varied so long as the temperature is controlled and polymerization of the substrate by its contact with sulfuric acid alone is avoided. When proper cooling means are provided, all of the reactants can be mixed and the heat of the resultant exothermic reaction can be dissipated in about an hour or less. In order to insure completion of the first step of the reaction it is advisable that the mixture of reactants be heated for a short time after the exothermic reaction has subsided. Heating up to 80° C., or preferably between 40° C. and 70° C. is suggested. At this stage the reactants have combined to form a substituted diformamide which is easily separated, if desired, after neutralization of the solution and extraction thereof with a solvent such as chloroform or ethylene dichloride. This intermediate product is 1,8-diformamido-p-menthane of the formula

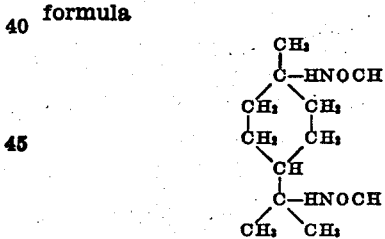

This intermediate diformamide need not, however, be isolated. Rather, in the second step in the preparation of the diamine this intermediate is hydrolyzed to the final product, 1,8-diamino-p-menthane. Some hydrolysis of the diformamide takes place during the heating step described above but what is required for substantially complete hydrolysis of the intermediate compound is that it be heated in the presence of a sufficient amount of water. For this purpose it has been found necessary to have water present in an amount from one to nine times the weight of sulfuric acid originally present. This means that water must be added at this stage if the amount employed originally is outside of these limits. For this step of hydrolysis temperatures above 80° C. and up to the refluxing temperature of the reaction mixture are recommended. This hydrolysis requires from about one-half to four hours for completion. One particularly good modification of the general process involves the use of water from the beginning in an amount equal to approximately twice the weight of sulfuric acid. That is, enough water is employed at the outset to give a concentration of sulfuric acid equal to 30% to 40%. The same steps of mixing, heating the mixture to temperatures below about 80° C. to form the intermediate, then hydrolyzing above about 80° C. and finally isolating the free diamine are followed without further adjustment in the amount of water.

The reaction mixture is then neutralized with a strong base such as an hydroxide of sodium, potassium, or calcium, and the free diamine is isolated, for example by salting out, solvent extraction or distillation, and is thereafter purified preferably by fractional distillation.

The following examples serve to illustrate how 1,8-diamino-p-menthane is made from the individual raw materials or substrates which are named above.

Example 1

Into a three-necked flask equipped with reflux condenser, thermometer, stirrer, and dropping funnel and immersed in an ice-bath were charged 1 mole of terpin hydrate, 12.5 moles of water, and 3 moles of hydrogen cyanide. To this stirred mixture was added dropwise 2.2 moles of sulfuric acid over a period of one-half hour while the temperature was maintained at 15°–25° C. Thereafter the mixture was held at 50°–60° C. for 1.5 hours. Water was then added in an amount equal to 5 moles and the resultant mixture was refluxed for thirty minutes after which it was neutralized with sodium hydroxide. Salt was added to the cooled solution, and the organic material which separated out overnight was removed and purified by distillation. A 61.3% yield was obtained of 1,8-diamino-p-menthane which boiled at 129° C./26 mm. and which had a specific gravity of 0.91, an index of refraction of 1.4794, and a neutral equivalent of 85. The analysis and determination of molecular weight confirmed the compound, 1,8-diamino-p-menthane.

Example 2

The general procedure of Example 1 was followed in this case but the amounts of terpin hydrate, hydrogen cyanide, sulfuric acid, and water were 1, 2.4, 2.0 and 18.3 moles, respectively. After the exothermic reaction resulting from the addition of sulfuric acid to the mixture of the three other reactants had subsided, the mixture was heated slowly to 80° C. and held at 80°–85° C. for three hours. The product which was identical with that produced by the method of Example 1 was obtained in a 69.1% yield based on the amount of consumed terpin hydrate.

Example 3

Alpha-terpineol was employed here instead of the terpin hydrate of Example 2. Otherwise the procedure was the same as that of Example 2. A 52.9% yield was obtained of a product which was identical with that obtained in the two examples above.

Example 4

By the procedure of Example 1 above, 1 mole of limonene, 2.2 moles of hydrogen cyanide and 2.2 moles of sulfuric acid were cautiously mixed and dissolved in an amount of water equal to one-half the weight of the sulfuric acid. After the mixture had been prepared, it was heated to 80° C. and held there for 1.5 hours, after which it was treated by the process described above. In this instance a 37.2% yield was obtained of 1,8-diamino-p-menthane.

In a similar manner a 37% yield of the diamine was obtained from turpentine which is a cheap and convenient source of alpha-pinene.

I claim:

1. A process for preparing 1,8-diamino-p-menthane which consists of first mixing at a temperature of 15°–50° C. one mole of a member of the class consisting of limonene, terpin hydrate, alpha-terpineol, beta-terpineol and alpha-pinene, 2 to 3 moles of hydrogen cyanide, 1.5 to 5.0 moles of sulfuric acid and water in an amount equal to 0.1 to 5 times the weight of the resultant aqueous sulfuric acid, heating said mixture at 40°–80° C. to form 1,8-diformamido-p-menthane, then continuing heating from 80° C. to the refluxing temperature in the presence of water totalling one to nine times the weight of said sulfuric acid, neutralizing the resultant mixture with a strong base, and finally isolating said 1,8-diamino-p-menthane.

2. A process for preparing 1,8-diamino-p-menthane which consists of first mixing at a temperature of 15°–50° C. one mole of a member of the class consisting of limonene, terpin hydrate, alpha-terpineol, beta-terpineol and alpha-pinene, 2 to 2.5 moles of hydrogen cyanide, 1.5 to 2.5 moles of sulfuric acid and water in an amount equal to two-thirds to three times the weight of the resultant aqueous sulfuric acid, heating said mixture at 40°–80° C. to form 1,8-diformamido-p-menthane, then continuing heating from 80° C. to the refluxing temperature in the presence of water totalling one to nine times the weight of said sulfuric acid, neutralizing the resultant mixture with a strong base, and finally isolating said 1,8-diamino-p-menthane.

NEWMAN M. BORTNICK.

REFERENCES CITED

The following references are of record in the file of this patent:

UNITED STATES PATENTS

| Number | Name | Date |
| --- | --- | --- |
| 2,457,660 | Gresham et al. | Dec. 28, 1948 |

OTHER REFERENCES

Ritter et al., J. A. C. S., vol. 70, pp. 4045–4048 (1948).

Ritter et al., J. A. C. S., vol. 70, pp. 4048–4050 (1948).

Degering "An Outline of Organic Nitrogen Compounds," University Lithoprinter, Ypsilanti, Michigan, 1945, pp. 409–410.